(12) United States Patent
Suzuki et al.

(10) Patent No.: US 7,469,580 B2
(45) Date of Patent: Dec. 30, 2008

(54) TIRE INFLATION PRESSURE DETERMINING SYSTEM AND TIRE INFLATION PRESSURE DETERMINING APPARATUS

(75) Inventors: Hirohisa Suzuki, Moriguchi (JP); Hiroshi Saito, Moriguchi (JP); Eiichiro Kuwako, Moriguchi (JP); Takashi Kunimi, Tokyo (JP)

(73) Assignees: Sanyo Electric Co., Ltd., Osaka (JP); Akebono Brake Industry Co., Ltd., Tokyo (JP)

( * ) Notice: Subject to any disclaimer, the term of this patent is extended or adjusted under 35 U.S.C. 154(b) by 0 days.

(21) Appl. No.: 11/885,284

(22) PCT Filed: Mar. 6, 2006

(86) PCT No.: PCT/JP2006/304297

§ 371 (c)(1),
(2), (4) Date: Aug. 29, 2007

(87) PCT Pub. No.: WO2006/095698

PCT Pub. Date: Sep. 14, 2006

(65) Prior Publication Data

US 2008/0168834 A1 Jul. 17, 2008

(30) Foreign Application Priority Data

Mar. 8, 2005 (JP) ............................. 2005-064522
Mar. 8, 2005 (JP) ............................. 2005-064523

(51) Int. Cl.
*B60C 23/02* (2006.01)

(52) U.S. Cl. ...................... 73/146.5; 73/146

(58) Field of Classification Search ........ 73/146–146.8; 340/442–447
See application file for complete search history.

(56) References Cited

U.S. PATENT DOCUMENTS

| 4,966,034 A | * | 10/1990 | Bock et al. | ................ | 73/146.5 |
| 5,109,213 A | * | 4/1992 | Williams | .................... | 340/447 |
| 5,260,683 A | | 11/1993 | Tanaka et al. | | |

(Continued)

FOREIGN PATENT DOCUMENTS

JP    U 1-147706    10/1989

(Continued)

*Primary Examiner*—Andre J Allen
*Assistant Examiner*—Jermaine Jenkins
(74) *Attorney, Agent, or Firm*—Oliff & Berridge, PLC (57) ABSTRACT

A tire inflation pressure determining system is provided in which measurement results are transmitted to the exterior without providing a high precision oscillation circuit to a tire-mounted air pressure determining system.

An LC resonance circuit is composed of a coil Ls and an inflation pressure sensor in which the electric capacitance varies in accordance with tire air pressure. The fluctuations of the electromagnetic field having a frequency f0 generated by a sensor control unit are sensed in a coil L2, a clock is generated based on the sensed fluctuations, the clock is inputted to a coil Le that is transformer coupled to the coil Ls, and the LC resonance circuit is excited. The output voltage of the LC resonance circuit is converted to digital data in an A/D conversion circuit in correspondence with the intensity of the resonance, the impedance of the coil L2 is varied in accordance with the bit sequence constituting the data, and a modulation is thereby generated in the voltage of a coil L1 of the sensor control unit via the electromagnetic field.

20 Claims, 4 Drawing Sheets

U.S. PATENT DOCUMENTS

| | | |
|---|---|---|
| 6,378,360 B1 | 4/2002 | Bartels |
| 6,658,928 B1 * | 12/2003 | Pollack et al. ................. 73/146 |
| 6,791,457 B2 * | 9/2004 | Shimura ..................... 340/448 |
| 7,379,800 B2 * | 5/2008 | Breed .......................... 701/29 |
| 2001/0004236 A1 | 6/2001 | Letkomiller et al. |
| 2006/0244581 A1 * | 11/2006 | Breed et al. ................. 340/447 |
| 2006/0273889 A1 * | 12/2006 | Schulze et al. .............. 340/445 |
| 2007/0125161 A1 * | 6/2007 | Bryzek et al. .............. 73/146.4 |

FOREIGN PATENT DOCUMENTS

| | | |
|---|---|---|
| JP | A 04-254730 | 9/1992 |
| JP | A 2000-517073 | 12/2000 |
| JP | A 2002-243554 | 8/2002 |
| JP | A 2003-517150 | 5/2003 |
| JP | A 2004-163134 | 6/2004 |
| WO | WO 01/43997 A1 | 6/2001 |

* cited by examiner

TIRE INFLATION PRESSURE DETERMINING SYSTEM AND TIRE INFLATION PRESSURE DETERMINING APPARATUS

TECHNICAL FIELD

The present invention relates to a tire inflation pressure determining system and a tire inflation pressure determining apparatus, and particularly relates to a system and apparatus in which a sensor mounted in a tire and a controller mounted on a vehicle body are wirelessly connected.

BACKGROUND ART

There is a trend in the United States in recent years in mandating that a tire air pressure monitoring system for monitoring tire air pressure be mounted in automobiles. Conventionally, there are systems that do not require a battery because of the use of a surface acoustic wave (SAW) device as a method for directly measuring the air pressure of a tire.

An RFID (Radio Frequency Identification) technique is known in which a wireless connection is provided between a tire-mounted pressure sensor and a controller on the vehicle body, and the two are electromagnetically coupled together.

Patent document 1 noted below describes a technique whereby electromagnetic waves are sent from a controller toward a sensor in which the resonance frequency varies in accordance with a measured value, and the measured value is determined by the controller on the basis of variations in the frequency of the electromagnetic waves returned from the sensor.

[Patent Document 1] U.S. Pat. No. 6,378,360

DISCLOSURE OF THE INVENTION

Problems to be Solved by the Invention

Providing an oscillation circuit that has good precision in a tire-mounted RFID transponder that includes an inflation pressure sensor is difficult in terms of cost and due to temperature variations. There is also a problem in that it is difficult to assure that frequency shifts produced in accordance with pressure are accurately sensed.

The distance between the controller on the vehicle body and the pressure sensor-containing RFID transponder mounted in a tire varies due to the rotation of the tire. A wireless connection between the tire-mounted device and the device on the vehicle body is implemented through the use of electromagnetic coupling or electromagnetic induction, and the strength of the connection is dependent on the distance between the two devices. Fluctuations in the electromagnetic field produced by the tire-mounted device and sensed by the controller on the vehicle body become faint and more susceptible to noise as the distance between the two devices increases.

The present invention was contrived in order to solve the above-described problems, and an object thereof is to provide a tire inflation pressure determining system and a tire inflation pressure determining apparatus that that can determine inflation pressure with high precision without the use of a high precision oscillation circuit in the RFID transponder, and that can smoothly transmit inflation pressure measurement results to a controller on the vehicle body when the vehicle is traveling.

Means for Solving the Problem

The tire inflation pressure determining system according to the present invention is a system in which a control unit and a sensor unit are wirelessly connected, wherein the control unit generates a transmission electromagnetic field that varies over time, and senses electromagnetic field fluctuations produced by the sensor unit; and the sensor unit comprises an antenna for converting variations in the transmission electromagnetic field into driving power of the sensor unit and producing the electromagnetic field fluctuations, an inflation pressure sensor whose electric capacitance varies in accordance with air pressure in a tire, a sensor resonance circuit for producing electrical resonance in accordance with the electric capacitance, a data generation circuit for generating transmission data that contains information of the air pressure on the basis of strength of the electrical resonance, and a response circuit for varying electric current that flows to the antenna in accordance with the bit values of the transmission data expressed by the digital data, and generating the electromagnetic field fluctuations.

In another tire inflation pressure determining system according to the present invention, the control unit varies the transmission electromagnetic field in accordance with a predefined transmission frequency; the sensor unit has a clock generation circuit for generating a frequency that corresponds to the transmission frequency on the basis of AC signals of the transmission frequency outputted from the antenna that has sensed the transmission electromagnetic field, and an excitation coil to which the clock is inputted; and the sensor resonance circuit has a resonance coil that constitutes an LC resonance circuit together with the electric capacitance and is electromagnetically coupled to the excitation coil.

In the tire inflation pressure determining system according to the present invention described above, the system may be configured so that the antenna has a coil and a capacitor that constitute a parallel LC resonance circuit for resonating at the transmission frequency.

In another tire inflation pressure determining system according to the present invention, the control unit selectively switches the transmission frequency between a first transmission frequency and a second transmission frequency in a time sharing fashion, and varies the transmission electromagnetic field in accordance with the transmission frequency; the antenna resonates at the first transmission frequency and increases the output of the drive power; and the sensor resonance circuit has a resonance coil that constitutes an LC resonance circuit together with the electric capacitance and that is excited by the transmission electromagnetic field, and has a resonance frequency that corresponds to the second transmission frequency.

In the tire inflation pressure determining system according to the present invention, the system may be configured so that the antenna has a capacitor and a coil that constitute a parallel LC resonance circuit for resonating at the first transmission frequency.

A preferred aspect of the present invention is a tire inflation pressure determining system in which the response circuit is a switching circuit for switching the impedance of the antenna in accordance with the bit value.

Another preferred aspect of the present invention is a tire inflation pressure determining system in which the sensor unit has a power circuit for rectifying and accumulating AC drive power generated in the antenna.

In another tire inflation pressure determining system according to the present invention, the sensor unit has a temperature sensor that determines the temperature in the tire;

and the data generation circuit includes information about the temperature in the transmission data.

In another tire inflation pressure determining system according to the present invention, the sensor unit has a memory in which associated information related to the tire on which the sensor unit is mounted is stored in advance; and the data generation circuit includes the associated information in the transmission data.

In another tire inflation pressure determining system according to the present invention, the sensor unit has a level-sensing circuit for sensing a strong connection state in which the amplitude of the AC signal outputted from the antenna in accordance with the variation in the transmission electromagnetic field is at a predefined level or higher; and a response circuit for varying the electric current that flows to the antenna in accordance with the bit values of the transmission data represented by the digital data, and generating the electromagnetic field fluctuations when the strong connection state has been sensed.

In the tire inflation pressure determining system according to the present invention, the system may be configured so that the antenna has a coil and a capacitor that constitute a parallel LC resonance circuit for resonating at the fluctuation frequency of the transmission electromagnetic field.

In the tire inflation pressure determining system according to the present invention, the system may be configured so that the sensor unit has a clock generation circuit for generating, based on the AC signal, a clock having a frequency that corresponds to the fluctuation frequency of the transmission electromagnetic field, and an excitation coil to which the clock is inputted; and the sensor resonance circuit has a resonance coil that constitutes an LC resonance circuit together with the electric capacitance and is electromagnetically coupled to the excitation coil.

The tire inflation pressure determining apparatus comprises an antenna for converting variations in the supplied electromagnetic field applied from the exterior, and generating electromagnetic field fluctuations toward the exterior; an inflation pressure sensor for varying the electric capacitance in accordance with the air pressure inside a tire; a sensor resonance circuit for producing electrical resonance in accordance with the electric capacitance; a data generation circuit for generating transmission data that includes information of the air pressure on the basis of the intensity of the electrical resonance; and a response circuit for varying the electric current that flows to the antenna in accordance with the bit values of the transmission data represented by the digital data, and generating the electromagnetic field fluctuations. The tire inflation pressure determining apparatus also transmits the transmission data to the exterior with the aid of the electromagnetic field fluctuations.

Another tire inflation pressure determining apparatus according to the present invention has a clock generation circuit for generating a clock having a frequency that corresponds to the receiving frequency on the basis of the AC signals having a predefined receiving frequency outputted from the antenna, and an excitation coil to which the clock is inputted; and the sensor resonance circuit has a resonance coil that constitutes an LC resonance circuit together with the electric capacitance and is electromagnetically coupled to the excitation coil.

In the tire inflation pressure determining apparatus according to the present invention, the apparatus may be configured so that the antenna has a coil and a capacitor that constitute a parallel LC resonance circuit for resonating at the receiving frequency.

Another tire inflation pressure determining apparatus according to the present invention is configured so that the apparatus is used under conditions that the supplied electromagnetic field varies at a supply frequency that is selectively switched between a first frequency and a second frequency in a time sharing fashion; the antenna resonates at the first transmission frequency and increases the output of the drive power; and the sensor resonance circuit has a resonance coil that constitutes an LC resonance circuit together with the electric capacitance and that is excited by the transmission electromagnetic field, and has a resonance frequency that corresponds to the second transmission frequency.

In the tire inflation pressure determining apparatus according to the present invention, the apparatus may be configured so that the antenna has a coil and a capacitor that constitute a parallel LC resonance circuit for resonating at the first frequency.

A preferred aspect of the present invention is a tire inflation pressure determining apparatus in which the response circuit is a switching circuit for switching the impedance of the antenna in accordance with the bit value.

Another preferred aspect of the present invention is a tire inflation pressure determining apparatus that has a power circuit for rectifying and accumulating AC drive power generated in the antenna.

Another tire inflation pressure determining apparatus according to the present invention has a temperature sensor for determining the temperature inside a tire; and the data generation circuit includes information about the temperature in the transmission data.

Another tire inflation pressure determining apparatus according to the present invention has a memory in which associated information related to the tire on which the sensor unit is mounted is stored in advance; and the data generation circuit includes the associated information in the transmission data.

Another tire inflation pressure determining apparatus according to the present invention has a level-sensing circuit for sensing a strong connection state in which the amplitude of the AC signal outputted from the antenna in accordance with the variation in the transmission electromagnetic field is at a predefined level or higher; and a response circuit for varying the electric current that flows to the antenna in accordance with the bit values of the transmission data represented by the digital data, and generating the electromagnetic field fluctuations when the strong connection state has been sensed.

In the tire inflation pressure determining apparatus according to the present invention, the data generation circuit generates the transmission data, which includes information of the strong connection state in addition to information of the air pressure; and the rotational speed of a tire can be measured by allowing information of the strong connection state included in the transmission data to be periodically received in the exterior.

The tire inflation pressure determining apparatus according to the present invention may be configured so that the antenna has a coil and a capacitor that constitute a parallel LC resonance circuit for resonating at the fluctuation frequency of the supplied electromagnetic field.

The tire inflation pressure determining apparatus according to the present invention may be configured so as to have a clock generation circuit for generating, based the AC signal, a clock having a frequency that corresponds to the fluctuation frequency of the supplied electromagnetic field, and an excitation coil to which the clock is inputted; and so that the sensor resonance circuit has a resonance coil that constitutes an LC resonance circuit together with the electric capacitance and is electromagnetically coupled to the excitation coil.

Another tire inflation pressure determining system according to the present invention is a system in which a control unit and a sensor unit are wirelessly connected, wherein the control unit generates a transmission electromagnetic field that varies over time, and senses electromagnetic field fluctuations produced by the sensor unit; and the sensor unit comprises an antenna for converting variations in the transmission electromagnetic field into driving power of the sensor unit and producing the electromagnetic field fluctuations, a level-sensing circuit for sensing a strong connection state in which the amplitude of the AC signal outputted from the antenna in accordance with the variation in the transmission electromagnetic field is at a predefined level or higher, an inflation pressure sensor for sensing air pressure in a tire, a data generation circuit for generating transmission data that includes information of the air pressure, and a response circuit for varying electric current that flows to the antenna in accordance with the bit values of the transmission data expressed by the digital data, and generating the electromagnetic field fluctuations when the strong connection state has been sensed.

In the tire inflation pressure determining system according to the present invention, the system may be configured so that the antenna has a coil and a capacitor that constitute a parallel LC resonance circuit for resonating at the fluctuation frequency of the transmission electromagnetic field.

In another tire inflation pressure determining system according to the present invention, the inflation pressure sensor has an electric capacitance that varies in accordance with the air pressure; the sensor unit furthermore has a sensor resonance circuit for generating electrical resonance in accordance with the electric capacitance; and the data generation circuit generates transmission data that includes information of the air pressure on the basis of the intensity of the electrical resonance.

The tire inflation pressure determining system according to the present invention may be configured so that the sensor unit has a clock generation circuit for generating a clock having a frequency that corresponds to the fluctuation frequency of the transmission electromagnetic field on the basis of the AC signal, and an excitation coil to which the clock is inputted; and the sensor resonance circuit has a resonance coil that constitutes an LC resonance circuit together with the electric capacitance and is electromagnetically coupled to the excitation coil.

A preferred aspect of the present invention is a tire inflation pressure determining system in which the response circuit is a switching circuit for switching the impedance of the antenna in accordance with the bit value.

Another preferred aspect of the present invention is a tire inflation pressure determining system in which the sensor unit has a power circuit for rectifying and accumulating AC drive power generated in the antenna.

The tire inflation pressure determining apparatus according to the present invention comprises an antenna for converting variations in the supplied electromagnetic field applied from the exterior, and generating electromagnetic field fluctuations toward the exterior; a level-sensing circuit for sensing a strong connection state in which the amplitude of the AC signal outputted from the antenna in accordance with the variation in the supplied electromagnetic field is at a predefined level or higher; an inflation pressure sensor for sensing air pressure inside a tire; a data generation circuit for generating transmission data that includes information of the air pressure; and a response circuit for varying the electric current that flows to the antenna in accordance with the bit values of the transmission data represented by the digital data, and generating the electromagnetic field fluctuations when the strong connection state has been sensed. The tire inflation pressure determining apparatus according to the present invention also transmits the transmission data to the exterior with the aid of the electromagnetic field fluctuations.

Another tire inflation pressure determining apparatus according to the present invention comprises an antenna for converting variations in the supplied electromagnetic field applied from the exterior, and generating electromagnetic field fluctuations toward the exterior; a level-sensing circuit for sensing a strong connection state in which the amplitude of the AC signal outputted from the antenna in accordance with the variation in the supplied electromagnetic field is at a predefined level or higher; an inflation pressure sensor for sensing air pressure inside a tire; a data generation circuit for generating transmission data that includes information of the air pressure and information of the strong connection state; and a response circuit for varying the electric current that flows to the antenna in accordance with the bit values of the transmission data represented by the digital data, and generating the electromagnetic field fluctuations when the strong connection state has been sensed. The tire inflation pressure determining apparatus according to the present invention can transmit to the exterior the transmission data with the aid of the electromagnetic field fluctuations. The rotational speed of a tire can be measured by allowing information of the strong connection state to be periodically received at the exterior.

In the tire inflation pressure determining apparatus according to the present invention, the apparatus may be configured so that the antenna has a coil and a capacitor that constitute a parallel LC resonance circuit for resonating at the fluctuation frequency of the supplied electromagnetic field.

In another tire inflation pressure determining apparatus according to the present invention, the inflation pressure sensor has an electric capacitance that varies in accordance with the air pressure; the tire inflation pressure determining apparatus furthermore has a sensor resonance circuit for generating electrical resonance in accordance with the electric capacitance; and the data generation circuit generates transmission data that includes information of the air pressure on the basis of the intensity of the electrical resonance.

The tire inflation pressure determining apparatus according to the present invention may be configured so as to have a clock generation circuit for generating a clock having a frequency that corresponds to the fluctuation frequency of the supplied electromagnetic field on the basis of the AC signal, and an excitation coil to which the clock is inputted; and so that the sensor resonance circuit has a resonance coil that constitutes an LC resonance circuit together with the electric capacitance and is electromagnetically coupled to the excitation coil.

A preferred aspect of the present invention is a tire inflation pressure determining system in which the response circuit is a switching circuit for switching the impedance of the antenna in accordance with the bit value.

Another preferred aspect of the present invention is a tire inflation pressure determining system that has a power circuit for rectifying and accumulating AC drive power generated in the antenna.

EFFECTS OF THE INVENTION

In accordance with the present invention, a tire-mounted sensor unit or a tire inflation pressure determining apparatus induces, based on fluctuations of an external electromagnetic field having a predefined frequency, a resonance phenomenon in an LC resonance circuit that includes the capacitance of an inflation pressure sensor. The inflation pressure sensor varies in capacitance in accordance with the inflation pressure and the capacitance varies the extent of the resonance. The output voltage of the LC resonance circuit is converted to digital data that corresponds to the extent of the resonance, and the electromagnetic field generated by the tire control unit and other devices outside of the tire is modulated by the digital data. The modulation of the electromagnetic field is sensed by devices outside of the tire, and the digital data can be detected and acquired. In the configuration of the present invention, a high-precision oscillation circuit is not required to be provided to the tire-mounted sensor unit or the tire inflation pressure determining apparatus. The intensity of the resonance that corresponds to variations in the capacitance of the inflation pressure sensor is determined and digitized in the sensor unit or the tire inflation pressure determining apparatus. Therefore, noise and other effects during transmission to units outside of the tire are avoided and highly precise inflation pressure data is externally acquired in a simple manner.

The electromagnetic field generated by the device on the vehicle body increases in intensity in positions in which, e.g., the sensor unit, tire inflation pressure determining apparatus, or other tire-mounted device are in close proximity with the tire control unit and other devices on the vehicle body. When the tire-mounted device is in a position in which the electromagnetic field increases in intensity in this manner, fluctuations in the electromagnetic field brought about by the tire-mounted device also become more intense in the position where the device on the vehicle body is located. In other words, the two devices are in a state of strong connection when the electromagnetic field increases in intensity. In the present invention, the amplitude of the AC signal that is generated in the antenna increases in accordance with the intensity of the electromagnetic field. A level-sensing circuit senses the strong connection state on the basis that the amplitude of the AC signal is at a predefined level or higher, and a response circuit causes the electromagnetic field to fluctuate on the basis of transmission data that contains air pressure information when the strong connection state has been sensed. In this manner, in accordance with the present invention, data is transmitted in a strong connection state. Therefore, electromagnetic field fluctuations that correspond to the data is increased in the position where the device on the vehicle body is located, the effect of noise is diminished, the data is easily and accurately sensed by the device on the vehicle body, and data can be appropriately transmitted to the device on the vehicle body.

BEST MODE FOR CARRYING OUT THE INVENTION

Examples (hereinafter referred to as embodiments) of the present invention are described below with reference to the drawings.

Embodiment 1

Figure 1:
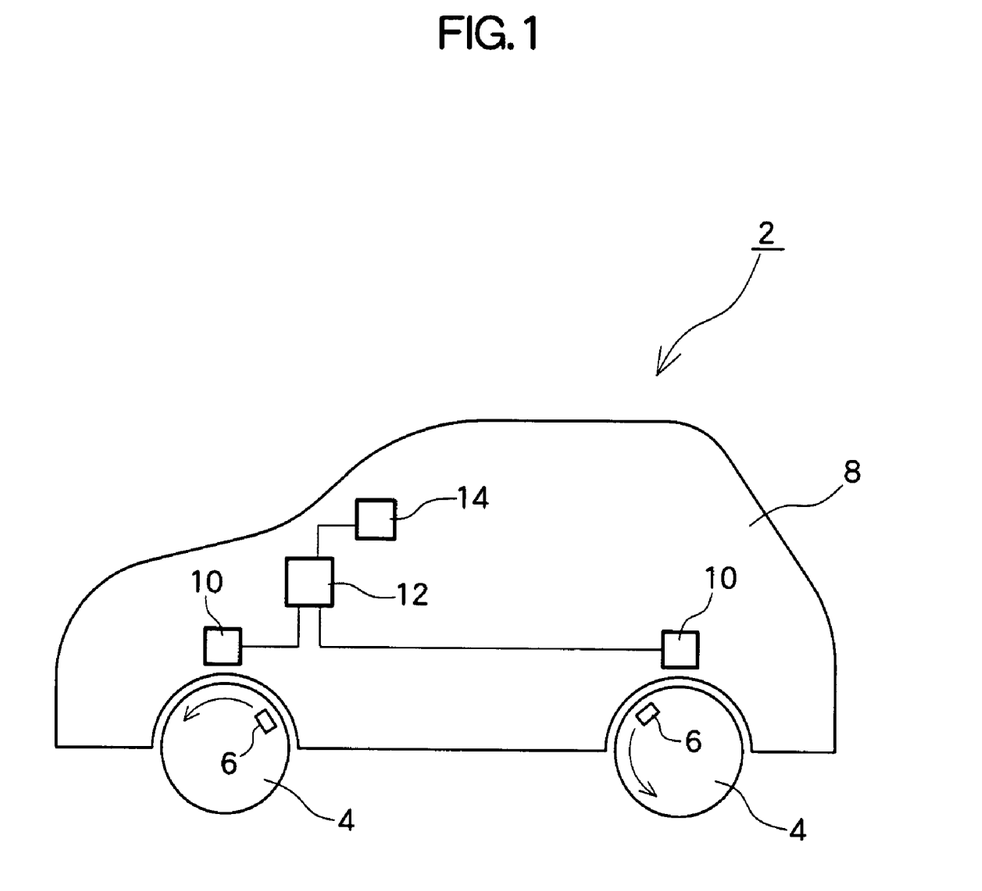
FIG. 1 is a schematic diagram showing the general configuration of a tire inflation pressure determining system according to the embodiments.

FIG. 1 is a schematic diagram showing the general configuration of a tire inflation pressure determining system for determining the tire air pressure of an automobile or another vehicle. The present system is composed of a sensor unit 6 mounted on each tire 4 of an automobile 2, and a sensor control unit 10 mounted in a position near [each] tire 4 of the vehicle body 8. The sensor units 6 and the sensor control units 10 are wirelessly connected. The sensor unit 6 determines the air pressure of a mounted tire and transmits the data. The sensor control unit 10 determines the data transmitted by the sensor units 6, and notifies, e.g., the ECU or other vehicle control unit 12. The vehicle control unit 12 can control the operation of the vehicle in accordance, e.g., with tire air pressure, and display the measurement results of the tire air pressure on a display device 14 to notify the driver.

Figure 2:
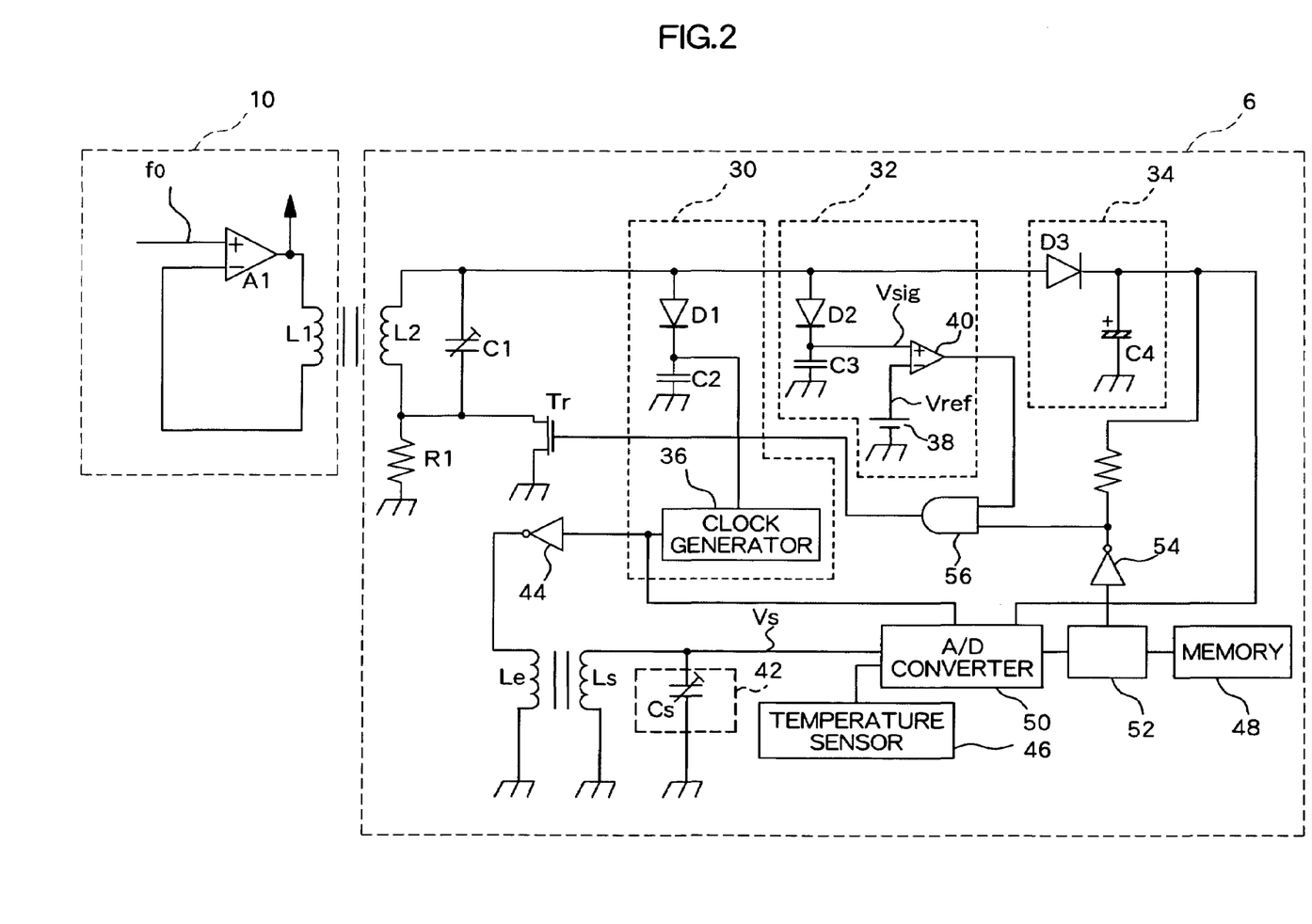
FIG. 2 is a schematic circuit diagram of the sensor unit and sensor control unit in embodiment 1.

FIG. 2 is a schematic circuit diagram of the sensor unit 6 and sensor control unit 10. The sensor control unit 10 is composed of a coil L1 and an operational amplifier A1. The operational amplifier A1 is configured so that the amplifier output and one of the input terminals are connected via the coil L1, and the amplifier generates AC current having a frequency f0 in the coil L1 in accordance with the clock of the frequency f0 fed to the other input terminal. The coil L1 determines magnetic field fluctuations generated by the sensor unit 6 and converts the fluctuations into voltage. Specifically, the voltage variations having the frequency f0, which are fed by the operational amplifier A1 to the coil L1, are amplitude-modulated in accordance with the data sent from the sensor unit 6. For example, the voltage of the output terminal of the operational amplifier A1 is brought out as the output voltage of the coil L1. The sensor control unit 10 detects voltage variations of the output terminal of the operational amplifier A1, extracts data sent from the sensor unit 6, and presents the data to the vehicle control unit 12.

The sensor unit 6 has a coil L2 and is wirelessly connected to the sensor control unit 10 via an electromagnetic field between the coil L2 and coil L1. For example, in the present system, a configuration is used in which the two coils are transformer coupled when the coil L1 and coil L2 are brought close together. When the coil L1 generates electromagnetic field fluctuations having a frequency f0 in the sensor control unit 10, an AC voltage having a frequency f0 is generated at both ends of the transformer-coupled coil L2.

A capacitor C1 is connected in parallel to the coil L2, and these constitute a parallel LC resonance circuit. The capacitance of the capacitor C1 is set so that the resonance frequency of the parallel LC resonance circuit is f0. The configuration of the LC resonance circuit allows the coil L2 to induce a resonance phenomenon in the frequency f0 component generated by the sensor control unit 10 from among the external AC electromagnetic fields, and to amplify the voltage amplitude of the alternating current generated at the two ends of the coil L2. One of the terminals of the coil L2 is grounded via a resistor R1 and is connected to a later-described transistor Tr.

A clock generation circuit 30, a level-sensing circuit 32, and a power circuit 34 are connected to the other terminal of the coil L2.

The clock generation circuit 30 is composed of a diode D1, a capacitor C2, and a clock generator 36. One terminal of the diode D1 is connected to the coil L2, and the other terminal is connected to one of the terminals of the capacitor C2 and to the clock generator 36. The other terminal of the capacitor C2 is grounded. Alternating current generated by the coil L2 is inputted to the diode D1 and is half-wave rectified and outputted. Since the capacitor C2 has relatively low capacitance and the smoothing effect of the capacitor C2 is low, a voltage signal that fluctuates in accordance with the frequency f0 outputted from the diode D1 is inputted to the clock generator 36. The clock generator 36 receives this voltage signal as a reference signal and generates and outputs a clock signal in correspondence with the cycle thereof. For example, the clock generator 36 outputs a clock signal having the same frequency f0 as the reference signal. The clock generator 36 may also be configured to generate and output a clock signal having a frequency obtained by dividing the reference signal.

The level-sensing circuit 32 is composed of a diode D2, a capacitor C3, a reference voltage source 38, and a comparator 40. One terminal of the diode D2 is connected to the coil L2, and the other terminal is connected to one of the terminals of the capacitor C3 and to the comparator 40. The other terminal of the capacitor C3 is grounded. Alternating current generated by the coil L2 is inputted to the diode D2 and is half-wave rectified and outputted. The capacitor C3 has a capacitance sufficient to smooth the fluctuations of a relatively high frequency f0, e.g., several 100 kHz to several 10 MHz. In other words, the diode D2 and capacitor C3 detect voltage signals having a frequency f0 produced in the coil L2, and draw out the amplitude-modulation component. As a result, voltage fluctuations having a lower frequency than the frequency f0 that appears in the output of the diode D2 are drawn out from the capacitor C3, and this is inputted to one of the terminals of the comparator 40. In the present system, such fluctuations at low frequencies can be produced by periodic variations in the distance between the sensor unit 6 and sensor control unit 10 due to the rotation of the tire 4 on which the sensor unit 6 is mounted.

The comparator 40 compares a voltage signal Vsig from the capacitor C3 inputted to one of the terminals, and a constant voltage Vref inputted from the reference voltage source 38 to the other terminal, outputs an H level voltage that corresponds to a digital value of "1" when the Vsig is at the threshold voltage Vref or higher, and outputs an L level voltage that corresponds to a digital value of "0" when Vsig is less than Vref. The output of the comparator 40 is used for transmitting data to be sent only when the sensor unit 6 has approached to within a predefined distance of the sensor control unit 10. To this end, the voltage Vref of the reference voltage source 38 is set in advance based on the value of Vsig when the sensor unit 6 has approached the sensor control unit 10. The reference voltage source 38 may be configured via a regulator circuit or the like.

The power circuit 34 is composed of a diode D3 and a capacitor C4, and feeds power that is required for each part of the sensor unit 6. The diode D3 is disposed between the input and output terminals of the power circuit 34, and one of the terminals of the capacitor C4 is connected to the output terminal. The other terminal of the capacitor C4 is grounded. The input terminal of the power circuit 34 is connected to the coil L2. The diode D3 rectifies the alternating current from the coil L2, and the capacitor C4 is charged by the output of the diode D3. The capacitor C4 is composed of an electrolytic capacitor or another capacitor that has a large capacitance.

The capacitor C4 converts the output of the diode D3 to direct current by smoothing and outputs the direct current from the power circuit 34.

The sensor unit 6 is provided with an inflation pressure sensor 42 that determines the air pressure of a tire. The inflation pressure sensor 42 is a capacitive pressure sensor and is a sensor element that varies the electrical capacitance Cs in accordance with pressure P. The capacitance Cs of the inflation pressure sensor 42 and the coil Ls together constitute a parallel LC resonance circuit. The coil Ls is transformer coupled to the coil Le. The coil Le receives as input the clock generated by the clock generator 36 by way of a buffer circuit 44.

Figure 3:
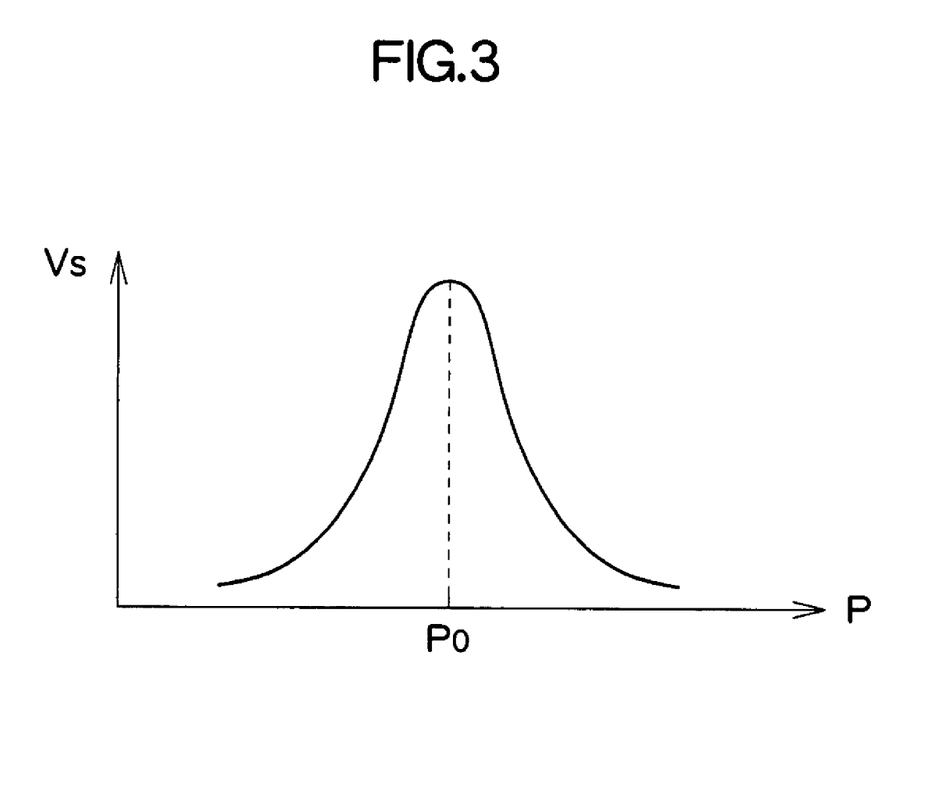
FIG. 3 is a schematic graph showing the variation of output voltage Vs of an LC resonance circuit composed of a coil Ls and a capacitance Cs, with respect to the air pressure P of the tire.

FIG. 3 is a schematic graph showing the variation of output voltage Vs of an LC resonance circuit, which is composed of the coil LS and the capacitance Cs, with respect to the air pressure P of the tire. The LC resonance circuit is configured so as to resonate at the frequency of the output clock of the clock generator 36 and to cause the voltage Vs to reaches a maximum with respect to the value the capacitance Cs at the reference pressure P0. The voltage Vs decreases as the air pressure P becomes offset from the reference pressure P0. For example, a configuration may be adopted in which the reference pressure P0 is set to the central value of an inflation pressure range that is deemed to be normal, and the vehicle control unit 12 is considered to be normal when the voltage Vs is at a predefined threshold value or higher.

The sensor unit 6 may be provided with a temperature sensor 46 and a memory 48.

The output voltage Vs of the LC resonance circuit and the output voltage of the temperature sensor 46 are inputted to an A/D (Analog-to-Digital) conversion circuit 50. The A/D conversion circuit 50 converts these analog input signals into digital data. The A/D conversion circuit 50 is supplied with driving power from the power circuit 34, and may be configured so as to use the output clock of the clock generator 36 in the A/D conversion processing.

The type and manufacture date of the tire, and other information related to the tire on which the sensor unit 6 is mounted are stored in the memory 48 in advance.

The transmission data generation circuit 52 reads the information from the memory 48 and generates transmission data with a predefined format. This transmission data is composed of data that expresses the information read from the memory 48 and data that is output from the A/D conversion circuit 50. The transmission data generation circuit 52 switches between an H level and an L level in accordance with the bit sequence constituting the transmission data.

The output of the transmission data generation circuit 52 is inputted to one of the terminals of an AND gate 56 via a buffer circuit 54. The output of the level-sensing circuit 32 is inputted to the other terminal of the AND gate 56. The AND gate 56 allows transmission data that contains inflation pressure data and the like to pass through only when the output of the level-sensing circuit 32 is at an H level.

The output of the AND gate 56 is presented to a gate of a transistor Tr. For example, the transistor Tr is switched on when the output of the AND gate 56 is at an H level, and the coil L2 is grounded via the transistor Tr. On the other hand, the transistor Tr is switched off when the output of the AND gate 56 is at an L level, and the coil L2 is grounded via the resistor R1. With this configuration, the impedance of the coil L2 is reduced more when the transistor Tr is on than when the transistor Tr is off.

Variation in the impedance of the coil L2 causes fluctuations in the electromagnetic field that couples the coils L1 and L2, and affects the voltage between the terminals of the coil L1 in the sensor control unit 10. Specifically, the sensor control unit 10 can, with the aid of the coil L1, sense as voltage variation the fluctuations in the electromagnetic field that are generated by the sensor unit 6 in accordance with the transmission data. The sensor control unit 10 reproduces the transmission data from the sensor unit 6 by detecting the voltage variation superimposed on the carrier of the frequency f0, and outputs the result to the vehicle control unit 12.

With the configuration described above, the ability to send or not send the transmission data from the sensor unit 6 is controlled by the AND gate 56 on the basis of the sensed results obtained in the level-sensing circuit 32. Additionally, the operation of the transmission data generation circuit 52 and the A/D conversion circuit 50 may also be controlled based on the sensed results obtained in the level-sensing circuit 32 to control the transmission data generation itself.

A temperature sensor 46 and a memory 48 are provided in the above-described configuration, but either one or both may be omitted. Also, the level-sensing circuit 32 may be omitted or simplified.

In the configuration described above, the sensor unit 6 generates, based on the fluctuations of the electromagnetic field sent by the sensor control unit 10, a clock that corresponds to the fluctuation frequency f0, and the clock is used to excite an LC resonance circuit composed of a coil Ls and a capacitance Cs. A simple configuration is thereby achieved without the need to provide the sensor unit 6 with an oscillation circuit that has good precision.

In the configuration described above, the level-sensing circuit 32 senses that the sensor unit 6 and the sensor control unit 10 are in a strong connection state, and the response circuit is able to transmit data only at that time. In accordance with the present configuration, data transmission from the sensor unit 6 can be efficiently carried out and data can be easily sensed with good precision by the sensor control unit 10.

In the transmission data generation circuit 52, information of the strong connection state may be included in the transmission data. For example, the clock generated in the sensor unit 6 may be counted and the clock count of the timing in which the strong connection state is sensed may be transmitted as information of the strong connection state. The sensor control unit 10 is capable of measuring the rotational speed of the tires on the basis of the receiving timing of the transmission data that is periodically sent by the sensor unit 6 in a strong connection state and on the basis of the information of the strong connection state included in the transmission data. In other words, the rotational speed of the tires can be externally measured by transmitting to the exterior the periodically sensed strong connection state with the aid of a mechanism for sensing the strong connection state described in the configuration above, and this mechanism may be used as means for sensing the rotational speed of the tire separately from sensing the air pressure of the tire.

Embodiment 2

Embodiment 2 of the present invention relates to another configuration of the sensor unit 6 and the sensor control unit 10 in the tire inflation pressure determining system shown in FIG. 1. The same reference numerals represent the same constituent elements as those in embodiment 1, and the description in the embodiment described above is invoked for simplification of description.

Figure 4:
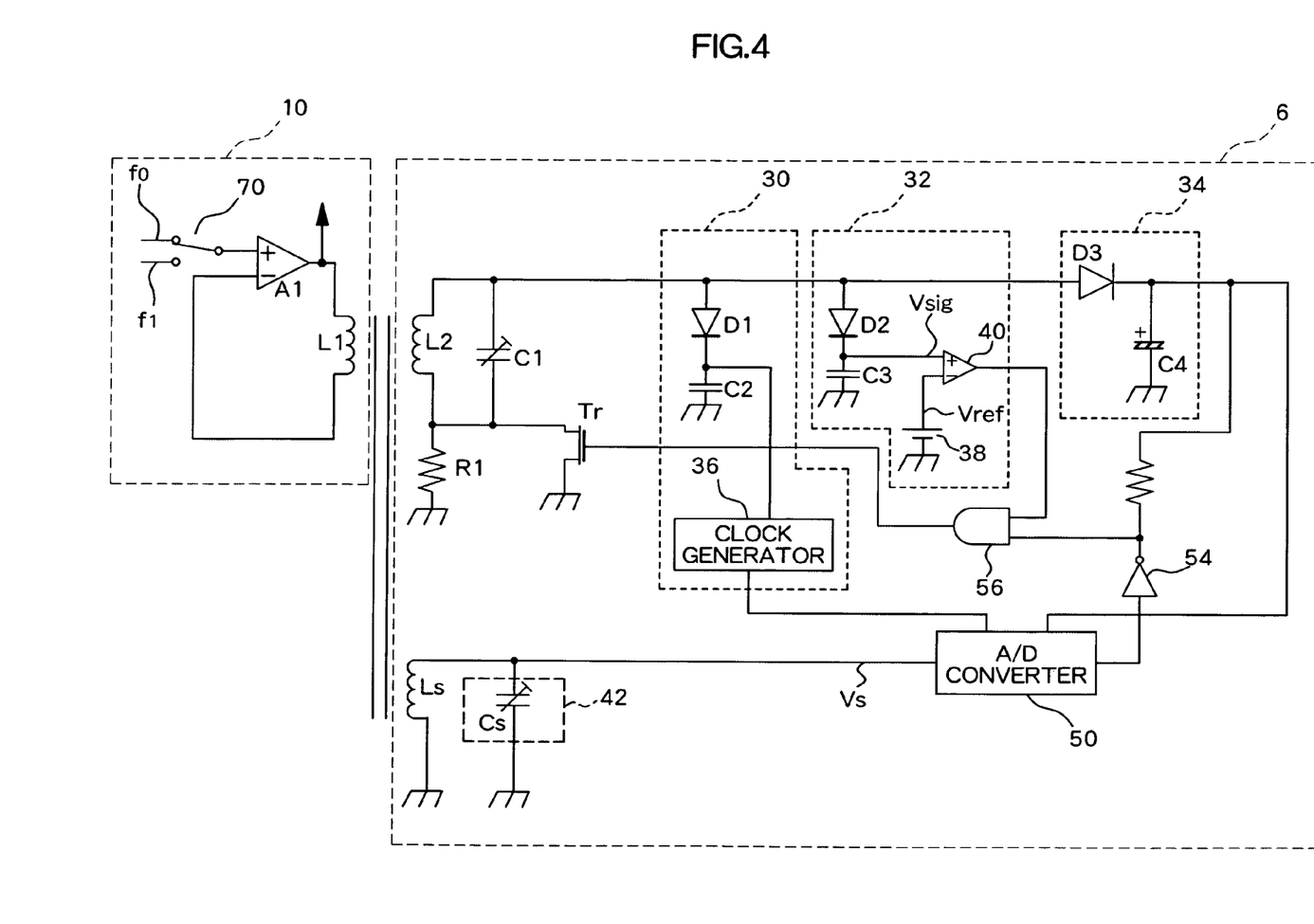
FIG. 4 is a schematic circuit diagram of the sensor unit and sensor control unit in embodiment 2.

FIG. 4 is a schematic circuit diagram of the sensor unit 6 and sensor control unit 10 in the present embodiment. The sensor control unit 10 is composed of a coil L1 and an operational amplifier A1. The basic point in the present embodiment in which the sensor control unit 10 differs from embodiment 1 is that the frequencies f0 and f1 of the clock inputted to one of the terminals of the operational amplifier A1 can be switched. Specifically, the sensor control unit 10 has a clock generator for the frequency f0 and a clock generator for the frequency f1 (the two clock generators are not shown), and is provided with a switch 70 for selecting between the outputs and inputting the result to the operational amplifier A1.

The basic point in the present embodiment in which the sensor unit 6 differs from embodiment 1 is that means for exciting the LC resonance circuit composed of a coil Ls and a capacitance Cs is located in the sensor control unit 10 rather than in the sensor unit 6 as such. In other words, the configuration does not have a coil Le to which the output clock of the clock generator 36 would be supplied. The LC resonance circuit composed of the coil Ls and the capacitance Cs is configured so that the resonance frequency becomes f1 at the reference inflation pressure P0. The coil Ls is configured so as to be capable of a transformer coupling with the coil L1 mounted in the sensor control unit 10 when, e.g., the sensor unit 6 and sensor control unit 10 have come into close proximity.

The sensor control unit 10 periodically switches between the frequencies f0 and f1. In the case of the frequency f1, the coil L1 and the coil Ls are transformer coupled, and the LC resonance circuit composed of the coil Ls and capacitance Cs generate a voltage that corresponds to the capacitance Cs as the output voltage Vs in the sensor unit 6. The output voltage Vs is held in the A/D conversion circuit 50.

Next, when the frequency is switched from f1 to f0 in the sensor control unit 10, the coils L1 and L2 are transformer coupled, the clock generation circuit 30 is actuated, and a clock is fed from the clock generator 36 to the A/D conversion circuit 50. The A/D conversion circuit 50 converts the voltage value Vs that is being held in the A/D conversion circuit 50 to a digital value, and chronologically outputs the bit sequence that expresses the value in synchronization with the clock. The transistor Tr is switched on and off in accordance with the output of the A/D conversion circuit 50, the impedance of the coil L2 is varied, and data is transmitted to the coil L1 coupled with the coil L2. The capacitor C4 of the power circuit 34 is charged in the time period in which the frequency is f0.

The sensor control unit 10 detects voltage variations at the output terminal of the operational amplifier A1 in the time period in which the frequency is f0 and determines the data outputted by the A/D conversion circuit 50 of the sensor unit 6.

The invention claimed is:

1. A tire inflation pressure determining apparatus, comprising:
    an antenna for converting variations in a supplied electromagnetic field applied from the exterior, and generating electromagnetic field fluctuations toward the exterior;
    an inflation pressure sensor whose electric capacitance varies in accordance with air pressure inside a tire;
    a sensor resonance circuit for producing electrical resonance in accordance with the electric capacitance;
    a data generation circuit for generating transmission data that includes information of the air pressure on the basis of intensity of the electrical resonance; and
    a response circuit for varying electric current that flows to the antenna in accordance with bit values of the transmission data represented by digital data, and generating the electromagnetic field fluctuations, wherein
    the transmission data is transmitted to the exterior with the aid of the electromagnetic field fluctuations.

2. The tire inflation pressure determining apparatus of claim 1, wherein:
  a clock generation circuit for generating a clock having a frequency that corresponds to the receiving frequency on the basis of the AC signals having a predefined receiving frequency outputted from the antenna, and
  an excitation coil to which the clock is inputted, wherein
  the sensor resonance circuit has a resonance coil that constitutes an LC resonance circuit together with the electric capacitance and is electromagnetically coupled to the excitation coil.

3. The tire inflation pressure determining apparatus of claim 2, wherein the antenna has a coil and a capacitor that constitute a parallel LC resonance circuit for resonating at the receiving frequency.

4. The tire inflation pressure determining apparatus of claim 1, wherein:
  the apparatus is used under conditions that the supplied electromagnetic field varies at a supply frequency that is selectively switched between a first frequency and a second frequency in a time sharing fashion;
  the antenna resonates at the first transmission frequency and increases the output of the drive power; and
  the sensor resonance circuit has a resonance coil that constitutes an LC resonance circuit together with the electric capacitance and that is excited by the transmission electromagnetic field, and has a resonance frequency that corresponds to the second transmission frequency.

5. The tire inflation pressure determining apparatus of claim 4, wherein the antenna has a coil and a capacitor that constitute a parallel LC resonance circuit for resonating at the first frequency.

6. The tire inflation pressure determining apparatus of claim 1, wherein the response circuit is a switching circuit for switching impedance of the antenna in accordance with the bit value.

7. The tire inflation pressure determining apparatus of claim 1, wherein a power circuit for rectifying and accumulating AC drive power generated in the antenna.

8. The tire inflation pressure determining apparatus of claim 1, wherein a temperature sensor for determining temperature inside a tire, wherein the data generation circuit includes information about the temperature in the transmission data.

9. The tire inflation pressure determining apparatus of claim 1, wherein a memory in which associated information related to the tire on which the sensor unit is mounted is stored in advance, wherein the data generation circuit includes the associated information in the transmission data.

10. The tire inflation pressure determining apparatus of claim 1, wherein:
  a level-sensing circuit for sensing a strong connection state in which amplitude of an AC signal outputted from the antenna in accordance with the variations in the transmission electromagnetic field is at a predefined level or higher; and
  a response circuit for varying electric current that flows to the antenna in accordance with bit values of the transmission data represented by digital data, and generating the electromagnetic field fluctuations when the strong connection state has been sensed.

11. The tire inflation pressure determining apparatus of claim 10, wherein:
  the data generation circuit generates the transmission data, which includes information of the strong connection state in addition to information of the air pressure; and
  the rotational speed of a tire can be measured by allowing information of the strong connection state included in the transmission data to be periodically received in the exterior.

12. The tire inflation pressure determining apparatus of claim 10, wherein the antenna has a coil and a capacitor that constitute a parallel LC resonance circuit for resonating at a fluctuation frequency of the supplied electromagnetic field.

13. The tire inflation pressure determining apparatus of claim 10, wherein:
  a clock generation circuit for generating, based the AC signal, a clock having a frequency that corresponds to a fluctuation frequency of the supplied electromagnetic field, and an excitation coil to which the clock is inputted; and wherein
  the sensor resonance circuit has a resonance coil that constitutes an LC resonance circuit together with the electric capacitance and is electromagnetically coupled to the excitation coil.

14. A tire inflation pressure determining apparatus, comprising:
  an antenna for converting variations in a supplied electromagnetic field applied from the exterior, and generating electromagnetic field fluctuations toward the exterior;
  a level-sensing circuit for sensing a strong connection state in which amplitude of an AC signal outputted from the antenna in accordance with the variations in the supplied electromagnetic field is at a predefined level or higher;
  an inflation pressure sensor for determining air pressure inside a tire;
  a data generation circuit for generating transmission data that includes information of the air pressure; and
  a response circuit for varying electric current that flows to the antenna in accordance with bit values of the transmission data represented by digital data, and generating the electromagnetic field fluctuations when the strong connection state has been sensed, wherein the transmission data is transmitted to the exterior with the aid of the electromagnetic field fluctuations.

15. The tire inflation pressure determining apparatus of claim 14, wherein the antenna has a coil and a capacitor that constitute a parallel LC resonance circuit for resonating at a fluctuation frequency of the supplied electromagnetic field.

16. The tire inflation pressure determining apparatus of claim 14, wherein:
  the inflation pressure sensor has an electric capacitance that varies in accordance with the air pressure;
  the tire inflation pressure determining apparatus furthermore has a sensor resonance circuit for generating electrical resonance in accordance with the electric capacitance; and
  the data generation circuit generates transmission data that includes information of the air pressure on the basis of intensity of the electrical resonance.

17. The tire inflation pressure determining apparatus of claim 16, wherein:
  a clock generation circuit for generating a clock having a frequency that corresponds to a fluctuation frequency of the supplied electromagnetic field on the basis of the AC signal, and an excitation coil to which the clock is inputted; and
  the sensor resonance circuit has a resonance coil that constitutes an LC resonance circuit together with the electric capacitance and is electromagnetically coupled to the excitation coil.

18. The tire inflation pressure determining apparatus of claim 14, wherein the response circuit is a switching circuit for switching impedance of the antenna in accordance with the bit value.

19. The tire inflation pressure determining apparatus of claim 14, wherein a power circuit for rectifying and accumulating AC drive power generated in the antenna.

20. A tire inflation pressure determining apparatus, comprising:

an antenna for converting variations in a supplied electromagnetic field applied from the exterior, and generating electromagnetic field fluctuations toward the exterior, a level-sensing circuit for sensing a strong connection state in which amplitude of an AC signal outputted from the antenna in accordance with the variations in the supplied electromagnetic field is at a predefined level or higher;

an inflation pressure sensor for determining air pressure inside a tire;

a data generation circuit for generating transmission data that includes information of the air pressure and information of the strong connection state; and a response circuit for varying electric current that flows to the antenna in accordance with bit values of the transmission data represented by digital data, and generating the electromagnetic field fluctuations when the strong connection state has been sensed; and wherein the transmission data is transmitted to the exterior with the aid of the electromagnetic field fluctuations, and the rotational speed of a tire can be measured by allowing information of the strong connection state to be periodically received at the exterior.

* * * * *